(12) United States Patent
Yehud et al.

(10) Patent No.: US 11,780,015 B2
(45) Date of Patent: Oct. 10, 2023

(54) MACHINING TOOL WITH DEPLOYABLE BLADE

(71) Applicant: Noga Engineering & Technology (2008) Ltd., Shlomi (IL)

(72) Inventors: Eitan Yehud, Nahariya (IL); Shay Raviv, Kiryat Motzkin (IL); Itay Roded, Kibbutz Cabri (IL)

(73) Assignee: Noga Engineering & Technology (2008) Ltd., Shlomi (IL)

( * ) Notice: Subject to any disclaimer, the term of this patent is extended or adjusted under 35 U.S.C. 154(b) by 0 days.

(21) Appl. No.: 17/342,353

(22) Filed: Jun. 8, 2021

(65) Prior Publication Data

US 2022/0388073 A1   Dec. 8, 2022

(51) Int. Cl.
*B23B 29/034* (2006.01)
*B23B 27/08* (2006.01)

(52) U.S. Cl.
CPC ........ *B23B 29/03489* (2013.01); *B23B 27/08* (2013.01); *B23B 2200/3654* (2013.01)

(58) Field of Classification Search
CPC ... B23B 29/03489; B23B 29/34; B23B 27/08; B23B 2200/3654; B23B 51/00
See application file for complete search history.

(56) References Cited

U.S. PATENT DOCUMENTS

| | | | | |
|---|---|---|---|---|
| 1,955,631 A | * | 4/1934 | Harris | ..................... E21B 10/32 175/407 |
| 2,663,203 A | * | 12/1953 | Fried | ...................... B23B 51/08 408/72 R |
| 3,195,378 A | * | 7/1965 | Cogsdill | ............... B23B 51/102 82/1.2 |
| 3,806,271 A | * | 4/1974 | Ishiguro | ................ B23B 51/102 408/187 |
| 3,975,111 A | * | 8/1976 | Kubicek | ............... B23B 51/101 408/239 R |
| 4,401,172 A | * | 8/1983 | Kessler | ................... E21B 10/32 175/283 |

(Continued)

FOREIGN PATENT DOCUMENTS

| | | | | |
|---|---|---|---|---|
| DE | 102008004516 A1 | * | 8/2009 | ......... B23B 51/0045 |
| EP | 2 589 451 | | 5/2013 | |

(Continued)

OTHER PUBLICATIONS

International Search Report for PCT Application No. PCT/IL2022/050593 dated Nov. 10, 2022.

*Primary Examiner* — Nicole N Ramos
(74) *Attorney, Agent, or Firm* — PEARL COHEN ZEDEK LATZER BARATZ LLP

(57) ABSTRACT

A machining tool may include an elongated body forming a duct therewithin, the duct extending from a proximal inlet at a proximal end of the body to a distal portion of the body having a first lateral opening. The tool may also include a plunger movable between a proximal first position and a distal second position along the duct. The tool may also include a resilient element to press the plunger towards the proximal inlet, and a pivotally deployable blade rotatable between a deployed state, when the plunger is in the first position, and a retracted state, when the plunger is in the second position, wherein the blade is deployable from the first lateral opening.

14 Claims, 8 Drawing Sheets

(56) References Cited

U.S. PATENT DOCUMENTS

| | | | | |
|---|---|---|---|---|
| 4,411,324 A | * | 10/1983 | Liebig | E21B 10/32 175/289 |
| 4,461,361 A | * | 7/1984 | Fuchs | E21B 10/345 175/269 |
| 4,586,573 A | * | 5/1986 | Jones | E21B 10/32 175/285 |
| 4,618,009 A | * | 10/1986 | Carter | E21B 47/095 175/269 |
| 4,690,594 A | * | 9/1987 | Kato | B23B 51/105 408/187 |
| 4,729,699 A | * | 3/1988 | Frazzoli | B23B 51/102 408/180 |
| 4,819,525 A | * | 4/1989 | Rabe | F16L 55/1608 408/1 R |
| 5,086,852 A | * | 2/1992 | van Buskirk | E21B 10/322 175/269 |
| 5,797,709 A | * | 8/1998 | Payne | B23B 51/0045 408/180 |
| 5,897,273 A | * | 4/1999 | Barbosa Leite | B23B 51/102 408/1 R |
| 5,927,911 A | * | 7/1999 | Steiner | B23Q 11/1023 408/187 |
| 6,238,150 B1 | * | 5/2001 | Yamada | B23B 51/101 408/154 |
| 8,292,554 B2 | * | 10/2012 | Heule | B23B 51/101 408/199 |
| 8,596,938 B2 | * | 12/2013 | Nedzlek | B23B 51/102 408/180 |
| 9,089,905 B1 | * | 7/2015 | Craig | B23B 51/08 |
| 9,120,163 B2 | | 9/2015 | Stunder | |
| 2004/0101378 A1 | * | 5/2004 | Wiles | B23B 51/101 408/188 |

FOREIGN PATENT DOCUMENTS

| | | |
|---|---|---|
| EP | 2 228 160 | 9/2020 |
| KR | 930006706 Y1 * | 10/1993 |

* cited by examiner

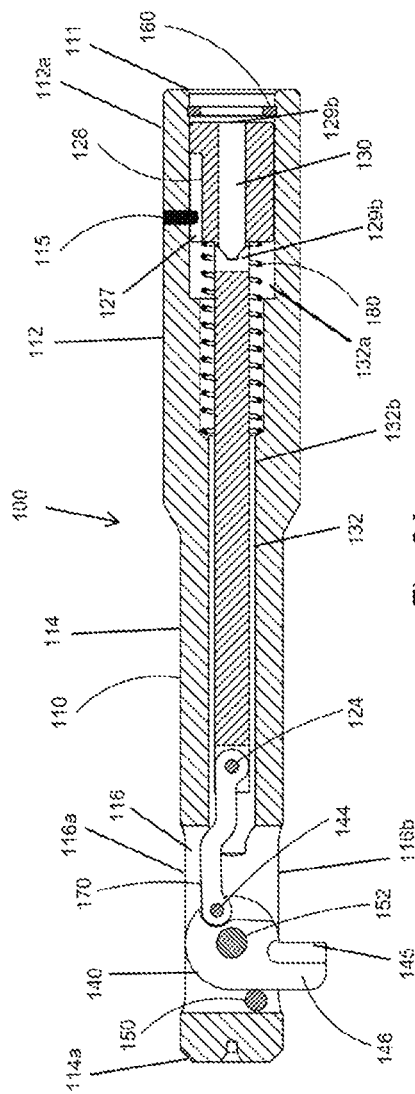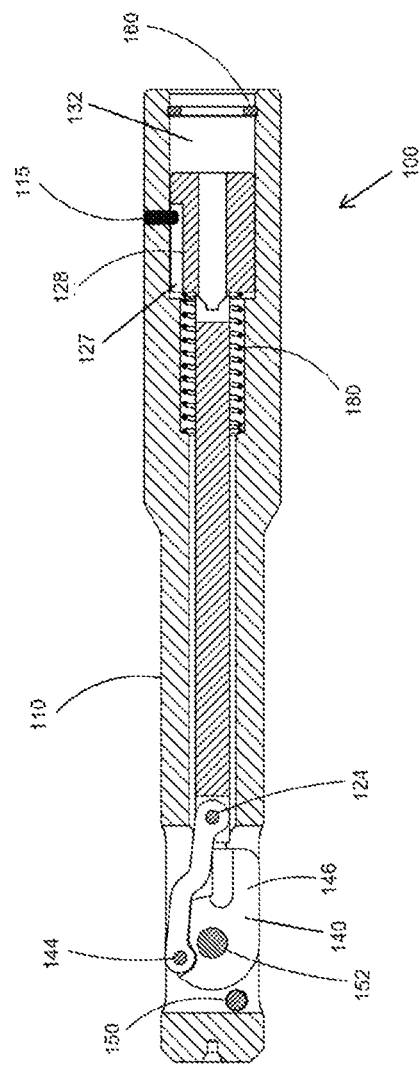

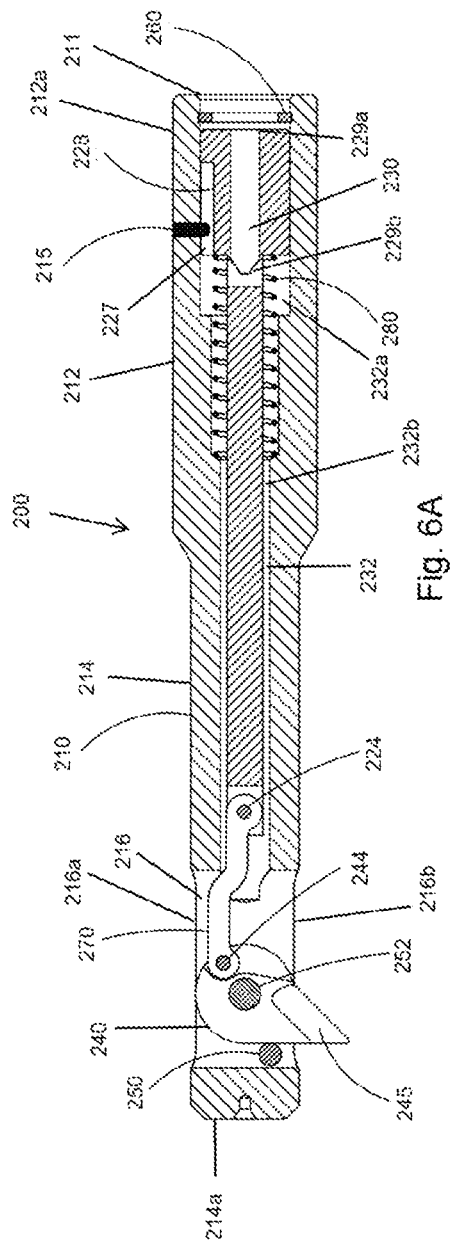
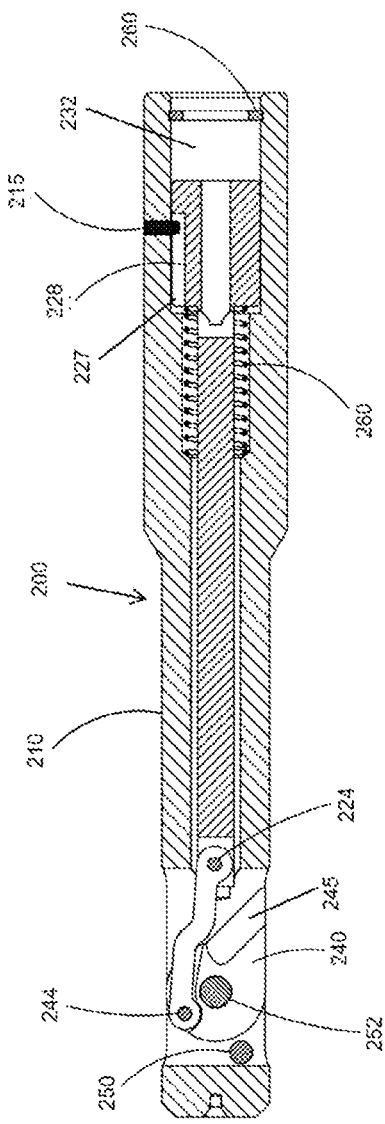
Fig. 6A
Fig. 6B

MACHINING TOOL WITH DEPLOYABLE BLADE

FIELD OF THE INVENTION

The present invention relates to machining. More particularly, the present invention relates to a machining tool with deployable blade.

BACKGROUND OF THE INVENTION

Typically, machining relates to a process through which material is controllably removed from a workpiece. A machining tool typically includes a spindle that is coupled to a machine (e.g., a mill) that rotates the spindle. A machining tool may have one or a plurality of blades or sharp edges designed to remove material from a workpiece in a controlled manner. Machining tools may be designed to mill, grind, scrape and/or drill a workpiece. The controllable and repetitive removal of material from a workpiece to produce a predetermined shape is known as subtractive manufacturing.

Machining tools are typically used in many technology fields. For example, the aerospace industry requires precision manufacturing, and machining tools are used to produce various precision products. Counterbores, countersinks and spotface holes are some of the features that may require the use of special machining tools.

Machining may be carried out on a proximal end of workpiece on sides of the workpiece and/or on a distal end of the workpiece. To perform machining on a distal end of the workpiece a machining tool may be inserted through a bore in the workpiece, to reach a distal end of the workpiece to grind, mill, deburr, chamfer and/or cut a hole in the back side of the workpiece. The access of a machining tool to a distal end of a workpiece may be prevented or restricted.

The machining process may require replacing machining tools multiple times in order to achieve certain features. For example, a drilling tool may be required to drill a hole in a workpiece, the drilling tool may then be replaced with a back-counterboring tool to produce a counterbore on a distal end of the workpiece. The back-counterboring tool may then be replaced with a (front) counterboring tool to produce a counterbore on a proximal end of the workpiece. Replacing tools during the machining process may be time consuming and may increase the cost of production.

SUMMARY OF THE INVENTION

There is thus provided, in accordance with an embodiment of the invention, a machining tool. The tool may include an elongated body forming a duct therewithin, the duct extending from a proximal inlet at a proximal end of the body to a distal portion of the body having a first lateral opening. The tool may also include a plunger movable between a proximal first position and a distal second position along the duct. The tool may also include a resilient element to press the plunger towards the proximal inlet, and a pivotally deployable blade rotatable between a deployed state, when the plunger is in the first position, and a retracted state, when the plunger is in the second position, wherein the blade is deployable from the first lateral opening.

According to some embodiments of the invention, the deployable blade is in the deployed state when the plunger is in the first position, and wherein the deployable blade is in the retracted state when the plunger is in the second position.

According to some embodiments of the invention, the plunger is hydraulically operated.

According to some embodiments of the invention, the plunger comprises a conduit to transfer emulsion through the plunger into the duct.

According to some embodiments of the invention, a gap is provided between the plunger and the duct to allow emulsion to flow through the gap to the to the distal portion of the body.

According to some embodiments of the invention, the deployable blade has a sharp edge on a proximal side of the deployable blade.

According to some embodiments of the invention, the deployable blade has a sharp edge on a distal side of the deployable blade.

According to some embodiments of the invention, the deployable blade has a sharp wedge on a tip of the deployable blade.

According to some embodiments of the invention, the deployable blade has an inclined sharp edge.

According to some embodiments of the invention, the distal portion of the body has a second opposite lateral opening.

According to some embodiments of the invention, the machining tool comprises a stopper at the proximal end of the body for stopping the plunger when the plunger is pressed by the resilient element towards the proximal inlet.

According to some embodiments of the invention, the machining tool comprises a stopper pin at a proximal portion of the body for preventing the plunger from rotating in the duct.

According to some embodiments of the invention, the machining tool comprises a stopper pin at the distal portion of the body, configured to stop the deployable blade from rotating beyond a predetermined angle.

According to some embodiments of the invention, the pivotally deployable blade is connected to the plunger via a connecting rod.

According to some embodiments of the invention, the connecting rod is offset with respect to an elongated axis of the plunger.

According to some embodiments of the invention, the tool includes a proximal resilient element between the plunger and the proximal inlet to force the plunger towards the distal portion of the body.

According to some embodiments of the invention, the duct comprises an internal thread and a threaded insert configured adjust a position of the plunger by adjusting a position of the threaded insert in the duct, the threaded insert connecting the proximal resilient element.

BRIEF DESCRIPTION OF THE DRAWINGS

In order for the present invention to be better understood and for its practical applications to be appreciated, the following figures are provided and referenced hereafter. It should be noted that the figures are given as examples only and in no way limit the scope of the invention. Like components are denoted by like reference numerals.

FIG. 3A is a cross sectional view of the machining tool of FIG. 1 with the deployable blade in a deployed state.

FIG. 3B is a cross sectional view of the machining tool of FIG. 1 with the deployable blade in a retracted state.

FIG. 6A is a cross sectional view of the machining tool of FIG. 4 with the deployable blade in a deployed state.

FIG. 6B is a cross sectional view of the machining tool of FIG. 4 with the deployable blade in a retracted state.

DETAILED DESCRIPTION OF THE INVENTION

Figure 1:
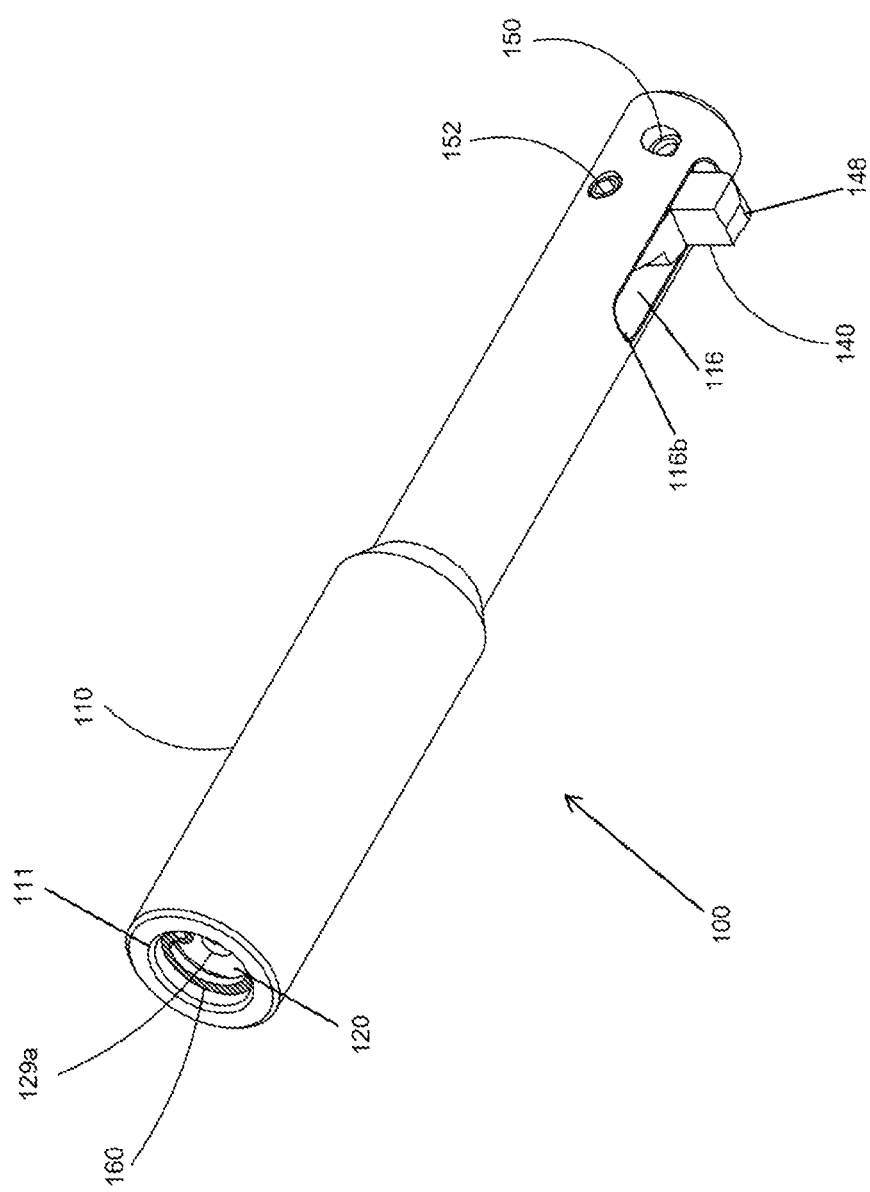
FIG. 1 is a general view of a machining tool according to some embodiments of the present invention with a deployable blade in the deployed state.

In the following detailed description, numerous specific details are set forth in order to provide a thorough understanding of the invention. However, it will be understood by those of ordinary skill in the art that the invention may be practiced without these specific details. In other instances, well-known methods, procedures, components, modules, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, the conjunction "or" as used herein is to be understood as inclusive (any or all of the stated options).

In some embodiments of the present invention a machining tool may have a body and one or a plurality of blades. The body of the machining tool may be elongated, for example a shank (e.g., substantially cylindrical). The body of the machining tool may vary in diameter. For example, a proximal portion of the machining tool body may have a different diameter than a distal portion of the machining tool body. The proximal end of the machining tool body may be configured to match a fixture. For example, some mills may have standard fixtures for holding machining tools. In some embodiments the mill may be designed to introduce emulsion into the machining tool that is held through the fixture. The distal end of the machining tool body may be provided in a variety of sizes and/or diameters. For example, the distal end of the machining tool body may be configured to be inserted through a bore in a workpiece, the hole in the workpiece may be configured to receive screws and fasteners of various diameters, as such, the distal portion of the machining tool may need to match various hole diameters.

A machining tool, according to some embodiments of the present invention, may include one or more blades. The blades of a machining tool may be designed to remove material from a workpiece. For example, when the machining tool is spun, the blade or blades of the machining tool may come in contact with the workpiece, removing material from the workpiece up to a desired extent. The rotation parameters (e.g., rounds per minute and torque) and the characteristics of the machining tool together with the workpiece properties may affect the amount and rate of material removal from the workpiece.

In some embodiments of the present invention a machining tool may include inserts. Inserts may refer to metal (or a similar tough material) parts that can be affixed or attached to a machining tool. For example, inserts may be affixed to the blades of a machining tool. Inserts may be made of tough material (e.g., tungsten carbide) to provide a durable tough edge for removing material from a workpiece, whereas the body of the machining tool may be made of softer metal (such as steel or carbon steel) for cost reduction and ease of manufacturing (e.g., steel is typically cheaper and more mailable than tungsten carbide). Inserts may be replaceable. For example, when inserts wear out, the inserts may be replaced rather than replacing the whole machining tool.

In some embodiments of the present invention a machining tool may be designed to deliver emulsion to the processing end of the tool. Emulsion (e.g., machine oil) may be used to lubricate the contact surface on which the blade of the machining tool acts on the workpiece, and to act as a coolant. A machining tool may heat up during the machining process, friction between the machining tool and the workpiece may heat up both the workpiece and the machining tool. Emulsion may be used to cool the machining tool and the workpiece, a flow of cool emulsion (e.g., the emulsion is cooler than the workpiece and/or the machining tool) sprayed on (or near) a contact surface between the machining tool and the workpiece may reduce the temperature of the workpiece and the machining tool. It may be important to keep the machining tool and/or the workpiece under a certain temperature. For example, if a machining tool heats beyond a certain temperature, this may affect the performance or even the sustainability of the machining tool, e.g. the blade may become softer (e.g., become more plastic, malleable and soft) and more prone to damage (e.g., the blade of the machining tool may become dull, bend or burn). Additionally, if the workpiece heats up too much it might get damaged.

In some embodiments of the present invention a machining tool may include one or a plurality of ducts (hereinafter "duct" for brevity) through which emulsion may flow. A mill that holds the machining tool through a fixture may be configured to introduce emulsion into a duct of the machining tool. The emulsion then may flow through the duct of the machining tool to reach a distal opening in the machining tool. The opening at the distal end of the machining tool may be configured to eject emulsion in the direction of a workpiece and/or in the direction of a contact surface between the blade of the machining tool and the workpiece. The applied emulsion may also assist in clearing material particles (e.g., metal shavings and metal debris caused by the milling process) to facilitate the machining process.

In some embodiments of the present invention, the duct may extend from a proximal inlet at a proximal end of the body to a distal portion of the body. The distal portion of the body may have a first lateral opening, wherein a blade (deployable blade) may be deployable from the first lateral opening.

In some embodiments of the present invention, a machining tool may have one or a plurality of deployable parts. For example, the machining tool may have one or a plurality of deployable blades.

In some embodiments of the present invention, a machining tool with a deployable blade in a retracted state may be configured to be inserted through a bore in a workpiece so that a distal part of the machining tool reaches a back side of the workpiece, where the deployable blade may then be deployed to process the back side of the workpiece. For example, the machining tool may be inserted through a bore in a workpiece to create a counterbore, countersink or a spotface hole on a backside of the workpiece. The deployable blade of the machining tool may be retracted after completing the designated task of machining a feature into a backside of a workpiece, to allow the machining tool to be pulled back through the bore in the workpiece. For example, after the feature is machined on a back side of a workpiece through a hole in the workpiece, the tool may be inserted further into the bore to distance the deployed blade from the processed surface at the back side of the workpiece to provide the depletable blade sufficient room to retract unobstructed. When the deployable blade is retracted the machining tool may then be pulled through the bore in the workpiece and removed from the workpiece.

In some embodiments of the present invention a deployable blade of a machining tool may be configured to have one sharp edge. The machining tool may have a deployable blade configured to machine a counterbore, wherein the deployable blade may have a sharp edge on an elongated portion of the deployable blade. For example, a machining tool configured to machine a back-counterbore may have a deployable blade with a sharp edge on a proximal part of the deployable blade, so that the sharp edge may face a surface on the back side of a workpiece on which it is to perform machining when in the deployed state.

In some embodiments of the present invention a machining tool configured to machine a counterbore may have a deployable blade with a straight sharp edge, so that the machined feature may yield a flat-bottomed hole. A deployable blade for making a back counterbore may have a pointed edge (e.g., a sharp tip, a beveled tip, a pointed tip) so as to yield a hole with flat edges.

In some embodiments of the present invention a machining tool with a deployable blade may include a blade that is configured to machine back counterbore and back spotfacing hole. For example, the deployable blade may be deployed to a deployed state after the machining tool is inserted through a hole in the workpiece for processing the back side of the workpiece to obtain a back-spotfacing hole, the deployable blade may remove material from the backside of the workpiece so as to machine a shallow hole with a flat bottom (e.g. a spotfacing hole).

In some embodiments of the present invention a machining tool may be configured to make a back-countersink using a deployable blade with a sharp edge on the proximal end of the blade so that the sharp edge may face a back side of a workpiece.

In some embodiments of the present invention a machining tool may be configured to machine a back countersink using an inclined deployable blade so that the resulting machined feature is cone shaped (tapered) countersink. The inclination angle of the deployable blade may be configured to match the angle of a screw with a conical head. The inclined deployable blade may be used to remove edges from a backside of a hole or to preform deburring to a backside of a hole in a workpiece.

In some embodiments of the present invention a machining tool may have a deployable blade with a sharp edge on the distal end of the deployable blade so as to perform machining on a front side of a workpiece. For example, a deployable blade with a sharp edge on the distal end of the deployable blade may be used to machine a frontal feature on a workpiece with a complex structure, and may be inserted, when the blade is in a retracted state, through a bore in the workpiece to reach a void within the workpiece where the deployable blade may then be deployed to a deployed state for machining a frontal feature on an internal surface of the workpiece (e.g., counterbore, countersink and spotfacing hole). When done, the blade may be retracted to the retracted state so as to enable the withdrawal of the machining tool through the bore. When done, the blade may be retracted and the machining tool pulled back through the bore and removed.

In some embodiments of the present invention a deployable blade of a machining blade may be configured to have sharp edges on two sides of the blade. For example, the deployable blade of the machining tool may be configured to machine a frontal feature on a front end of the workpiece, or a front facing internal surface within the workpiece, and/or machine a back feature on the back side of the workpiece, or a back facing internal surface within the workpiece. Using a machining tool with a deployable blade of a machining blade may be configured to have sharp edges on two sides of the blade may replace consecutive replacements of machining tools to machine different features, thus reducing the processing time and cost of machining.

In some embodiments of the present invention a machining tool with a deployable blade may be configured to machine features and finishes. For example, a machining tool with a deployable blade configured to machine back-countersinking may be used to perform edge breaking, deburring and chamfering of a workpiece. The deployable blade may remove a small amount of material from edges of a workpiece (e.g., sharp edges of a bore in the workpiece) so as to break the edges of said workpiece. A machining tool with a deployable blade may be configured to chamfer, break edges and deburr a workpiece on front facing surfaces and/or on back facing surfaces.

In some embodiments of the present invention, a machining tool with a deployable blade may include a duct. A plunger may connect to the deployable blade for deploying and retracting the deployable blade. The machining tool may include an elongated body substantially cylindrical in shape. The machining tool may include a hollow cylindrical duct, with a plunger in said duct to operate the deployable blade. The plunger may be linked to a resilient element (e.g., spring, coil, elastic element). The resilient element may exert force on the plunger so as to push the plunger towards a proximal end of the machining tool, where it is pressed against a stopper. The plunger may be connected to the deployable blade with a connecting rod. The connecting rod may be generally linear and/or present a twisted arm, configured to pull or push the deployable blade to rotate the deployable blade about an axis within the machining tool between a retracted state and a deployed state.

In some embodiments of the present invention, the duct within the machining tool may end at distal portion of the machining tool. the machining tool may be operated hydraulically. Emulsion introduced into the duct of the machining tool (e.g., through a proximal inlet at a proximal end of the machining tool) and may be applied onto the processing surface though the distal portion of the machining tool. The deployable blade may be deployed through a first lateral opening in the distal portion of the machining tool. In some embodiments the distal portion of the machining tool may include two substantially opposite lateral openings (e.g., a first lateral opening and a second lateral opening). The deployable bade may be deployable through one of the opposite lateral openings. The deployable blade may be configured to pivot into or out of either of the lateral openings. For example, the deployable blade may pivot a about a pin positioned at the distal portion of the machining tool.

In some embodiments of the present invention, a machining tool may have a deployable blade whose default state is the deployed state. For example, when no external forces are applied to the machining tool, the deployable blade may be in the deployed state. A plunger may move between a proximal first position and a distal second position within a duct of the machining tool. For example, in the proximal first position the plunger is held in position within the duct near the proximal end of the machining tool, for example by a resilient element (e.g., a spring, a coil, an elastic element, and any similar elastic element that returns force when pushed), such that the deployable blade remains in a deployed state. For example, in the distal second position the plunger is pushed, for example by the plunger, deeper into the duct in the direction of the distal end of the machining tool, causing the deployable blade to rotate into the body of the machining tool to be held in a retracted state.

In some embodiments of the present invention, the machining tool may be operated hydraulically. Emulsion may be introduced into the duct of the machining tool through an inlet at the proximal end of the tool, so as to apply force on the plunger to move the plunger to the distal second position within the duct, causing the deployable blade to rotate to the retracted state, and holding the blade within the body of the machining tool.

In some embodiments of the present invention, when the pressure of the emulsion resides, the resilient element that was pushed by the introduced emulsion prevails and returns the plunger back toward the proximal end of the machining tool (to the first position), turning the deployable blade into the deployed state. For example, emulsion may be introduced through an inlet at a proximal portion of the machining tool so that the deployable blade is retracted to the retracted state. The machining tool may then be inserted through a bore in a workpiece so as to reach a back side of the workpiece. When the distal end of the tool reaches out of the workpiece at a back side of the workpiece, the introduction of emulsion may be stopped so as to cause the deployable blade to deploy. The machining tool may then be drawn back closer to the back surface of the working tool. The tool may be rotated rapidly with a sharp edge of the deployable blade placed in contact with the back surface of the workpiece and process that surface. Emulsion may be applied through the duct onto the processed surface.

In some embodiments of the present invention a machining tool with a deployable blade may have a stopper pin to prevent rotation of the deployable blade beyond a certain position. For example, the maximum allowable deployment of the deployable blade may position the deployable blade in a direction perpendicular to the machining tool. It may be beneficial to ensure that the blade is parallel to the machining tool to form features with a predetermined angle (e.g. a deployable blade with a straight edge may machine a counter bore, a deployable blade with an inclined edge may machine a countersink). Additionally, the stopper pin may serve as a safety measure for preventing the machining tool (and the workpiece) from sustaining damage. For example, if the machining tool is pulled back through the bore while the blade is deployed, the deployable blade or the tool itself may break, as the blade is forced beyond a predetermined deployment angle set by the stopper pin. Thus, the stopper pin may be configured to break when the pulling force reaches a predetermined threshold so as to allow the withdrawal of the machining tool without causing damage to the deployable blade or to the workpiece.

In some embodiments of the present invention, a machining tool may include a plunger movable between a proximal first position and a distal second position along the duct. The machining tool may include a pivotally deployable blade. The deployable blade may be rotatable between a deployed state, when the plunger is in the first position, and a retracted state, when the plunger is in the second position.

Figure 2:
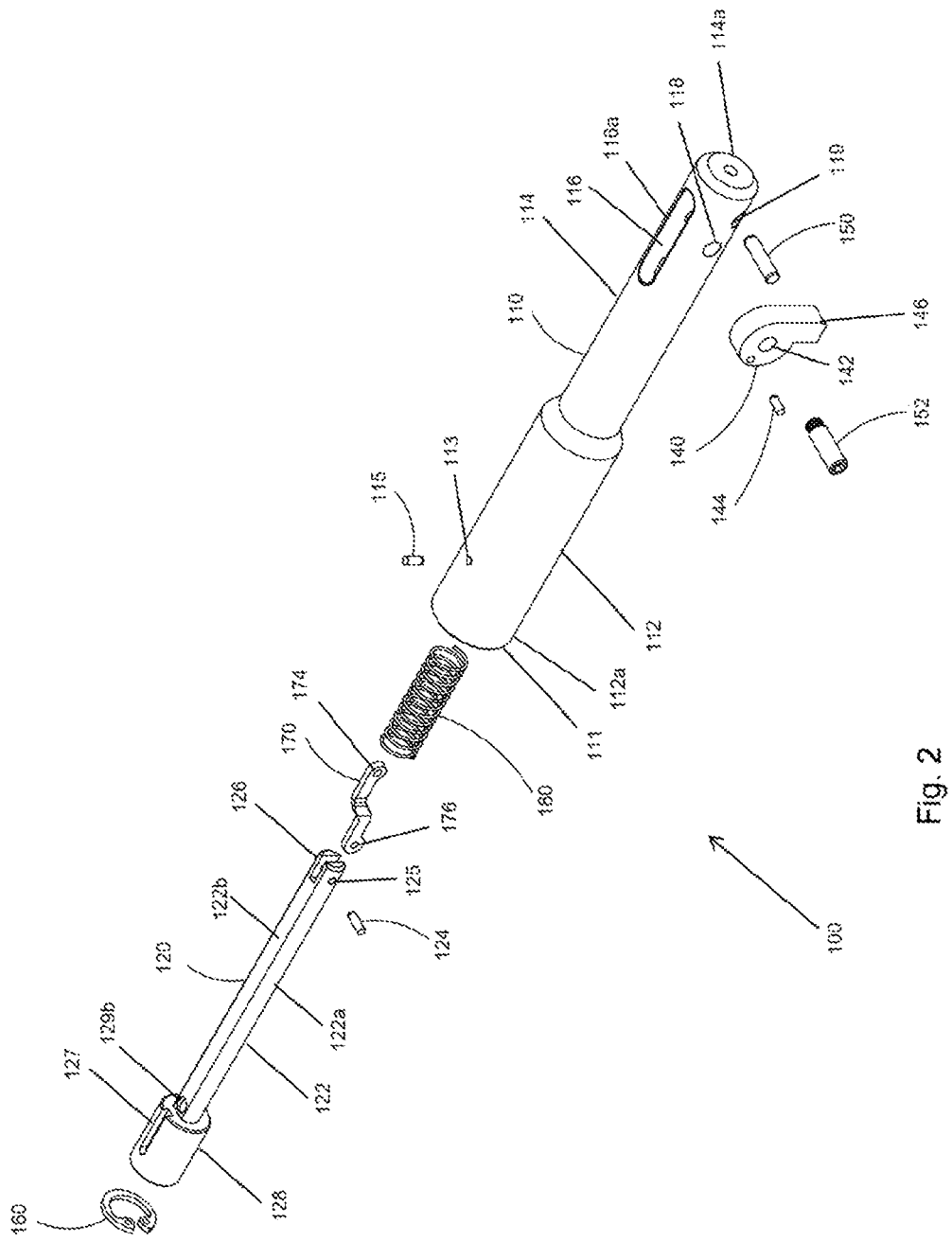
FIG. 2 is an exploded view of the machining tool of FIG. 1.

FIG. 1 is a general view of a machining tool with a deployable blade in the deployed state, according to some embodiments of the present invention. FIG. 2 is an exploded view of the machining tool of FIG. 1. FIG. 3A is a cross sectional view of the machining tool of FIG. 1 with the deployable blade in a deployed state. FIG. 3B is a cross sectional view of the machining tool of FIG. 1 with the deployable blade in a retracted state.

Machining tool 100 may have elongated body 110 with duct 132. The length of body 110 may vary. For example, body 110 may long to fit inside a deep hole in a workpiece. Additionally, or alternatively, body 110 may be short to account for engineering restrictions such as body 110 material strength and durability (e.g., the longer the body 110, the more stress and momentum it endures). Duct 132 may extend from proximal inlet 111 at proximal end 112*a* of body 110, through body 110 to distal portion of the duct 116 at distal portion 114 of body 110. Duct 132 may transfer emulsion. Distal portion 114 of body 110 may have first lateral opening 116*b*, deployable blade 140 may deploy from opening 116*b*. Distal portion 114 of body 110 may have second lateral opening 116*a*. For example, first lateral opening 116*b* and second lateral opening 116*a* may be substantially parallel and may be at opposing sides of body 110. Lateral opening 116*a* may be used to facilitate the retraction and deployment of deployable blade 140. For example, parts of deployable blade 140 and parts of connecting rod 170 may require extending outside of distal portion 114 of body 110 to complete a movement between a retracted state of blade 140 and a deployed state of blade 140.

In some embodiments of the present invention, duct 132 may have plunger 120. For example, duct 132 may match the shape of plunger 120. Plunger 120 may have proximal portion 128 of plunger 120 and distal portion 122 of plunger 120. Proximal portion 128 of plunger 120 may be wider than distal portion 122 of plunger 120. For example, distal portion 122 of plunger 120 may be narrow as to accommodate various diameters of distal portion 114 of body 110, the width of distal portion 140 of body 110 may vary in order to fit in holes with different diameters. Proximal portion 112 of body 110 may be wider than distal portion 114. For example, proximal portion 112 of body 110 may be wide enough to accommodate proximal portion 128 of plunger 120 and resilient element 180.

Plunger 120 may be movable between a proximal first position to a distal second position along duct 132. A proximal first position may refer to a position of plunger 120 along duct 132, wherein plunger 120 may be positioned towards proximal end 112 a of tool 110. A distal second position may refer to a position of plunger 120 along duct 132, wherein plunger 120 may be positioned deeper into duct 132, closer to distal portion 114 of tool 110. Resilient element 180 may press plunger 120 towards proximal inlet 111 so as to hold plunger 12 in the first position.

In some embodiments of the present invention, proximal portion 128 of plunger 120 may have groove 127, stopper 115 may be inserted through stopper hole 113 in body 110. For example, stopper 115 inserted at proximal portion 112 of body 110 may slide in groove 127 for preventing plunger 120 from going into duct 132 beyond a predetermined distance. Stopper pin 115 may slide in groove 127 to prevent plunger 120 from rotating in duct 132. For example, machining tool 100 may rotate, exerting rotation momentum on plunger 120, stopper pin 115 may be in groove 127 and may prevent plunger 120 from rotating in duct 132. If plunger 120 goes further into duct 132 (e.g. if stopper 115 is lacking), plunger 120 and deployable blade 140 might be damaged. Stopper clip 160 may be inserted at proximal end 112a of body 110 for stopping plunger 120 from being ejected out of proximal inlet 111. For example, in the assembly process of machining tool 100, plunger 120 may be inserted to duct 132, afterwards stopper clip 160 may be inserted at proximal end 112a of body 110 to keep plunger 120 in place (e.g., resilient element 180 may not push plunger 120 out of opening 111 if there is clip 160).

In some embodiments of the present invention, distal portion 122 of plunger 120 may be substantially cylindrical. For example, distal portion 122 of plunger 120 may have a circular cross section. A gap may be provided between plunger 120 and duct 130 to allow emulsion to flow through the gap to distal portion 114 of body 110. E.g., the gap provided between plunger 120 and duct 130 may be through carving plunger 120 and/or duct 130 to make space for emulsion to flow through the gap. Distal portion 122 of plunger 120 may have one or a plurality of lateral surfaces that are round and one or a plurality of lateral surfaces that are flat. The flat surfaces may be used to transfer emulsion through duct 132 to distal portion 114 of body 110, wherein emulsion may flow in volume between duct 132 and plunger 120 (e.g., the vacant volume created between a flat surface of plunger 120 and the round surface of duct 130). For example, distal portion 122 of the plunger 120 may have at least one flat surface 122b to transfer emulsion to distal portion 114 of body 110. Distal portion 122 of plunger 120 may have round side 122a, round side 122a may match the curvature of duct 132. Distal portion 122 of plunger 120 or body 110 may have one or a plurality tubes or conduits to transfer emulsion to distal portion 114 of body 110.

In some embodiments of the present invention, pivotally deployable blade 140 may connect to plunger 120 via connecting rod 170. Connecting rod 170 may have distal pin hole 174 and proximal pin hole 176. Plunger 120 may have slot 126 and pin hole 125 at a distal end of plunger 120. Connecting rod 170 may be inserted to slot 126 of linger 120, connecting rod 170 may pivot about pin 124 inserted in pin hole 125. Connecting rod 170 may connect to deployable blade 140 by pin 144, connecting rod 170 may pivot about pin 144.

In some embodiments of the present invention, deployable blade 140 may be rotatable between a deployed state, when deployable blade 140 protrudes outside distal portion 114 of body 110 (e.g., through opening 116b) and plunger 120 is in the first position, and a retracted state, when deployable blade 140 is retracted to distal portion 114 of body 110 and plunger 120 is in the second position.

In some embodiments of the present invention, plunger 120 may have conduct 130 at proximal end 128 of plunger 120. Conduit 130 may transfer emulsion introduced into machining tool 100 to distal portion 114 of body 110 (e.g., to deploy and retract deployable blade 140 hydraulically). For example, emulsion introduced into machining tool 100 through proximal inlet 111 may flow through proximal inlet 129b of conduit 130 to distal opening 129a, then emulsion may flow further through duct 132 to reach distal portion 114 of body 110 and flow out of first lateral opening 116b and second lateral opening 116a.

In some embodiments of the present invention, machining tool 100 may have safety 150 pin at distal portion 114 of body 110. Stopper pin 150 may prevent deployable blade 140 from rotating beyond a predetermined degree. Deployable blade 140 may have a sharp edge 145 on a proximal side of deployable blade 140 for machining features on a back side of a workpiece. Deployable blade 140 may have a straight sharp edge 145 configured to machine a flat-bottomed hole (e.g., a counterbore). In the deployed state, deployable blade 140 may be deployed from distal portion 114 of body 110 (e.g., through opening 116a), plunger 120 may be in the first position.

In some embodiments of the present invention, in the retracted state, deployable blade 140 may be retracted into distal portion 114 of body 110, plunger 120 may bein the second position. Connecting rod 170 may match the shape of deployable blade 140, so both deployable blade 140 and connecting rod 170 can fit in distal portion 114 of body 110, in the retracted state. For example, part of deployable blade 140 and connecting rod 170 may be abutting or positioned side by side inside distal portion 114 of body 110, in the retracted state. Connecting rod 170 may be offset. For example, connecting rod 170 may be twisted or have an offset, the shape of the connecting rod 170 (e.g., the offset) may help connecting rod 170 to apply force on deployable blade 140 to rotate blade 140. Connecting rod 170 may have an offset that matches the shape of deployable blade 140, so that when deployable blade 140 is in the retracted state, deployable blade 140 and the connecting rod 170 may fit inside distal portion 114 of body 110.

In some embodiments of the present invention, deployable blade 140 may have wedge 148 on the tip of deployable blade 140 for machining a straight-edge hole in a workpiece (e.g., the straight edges of a counterbore). For example, deployable blade 140 may have a sharp edge, a bevel, a point and any similar geometries on the top of deployable blade 140 for machining a straight-edge hole in a workpiece.

Figure 4:
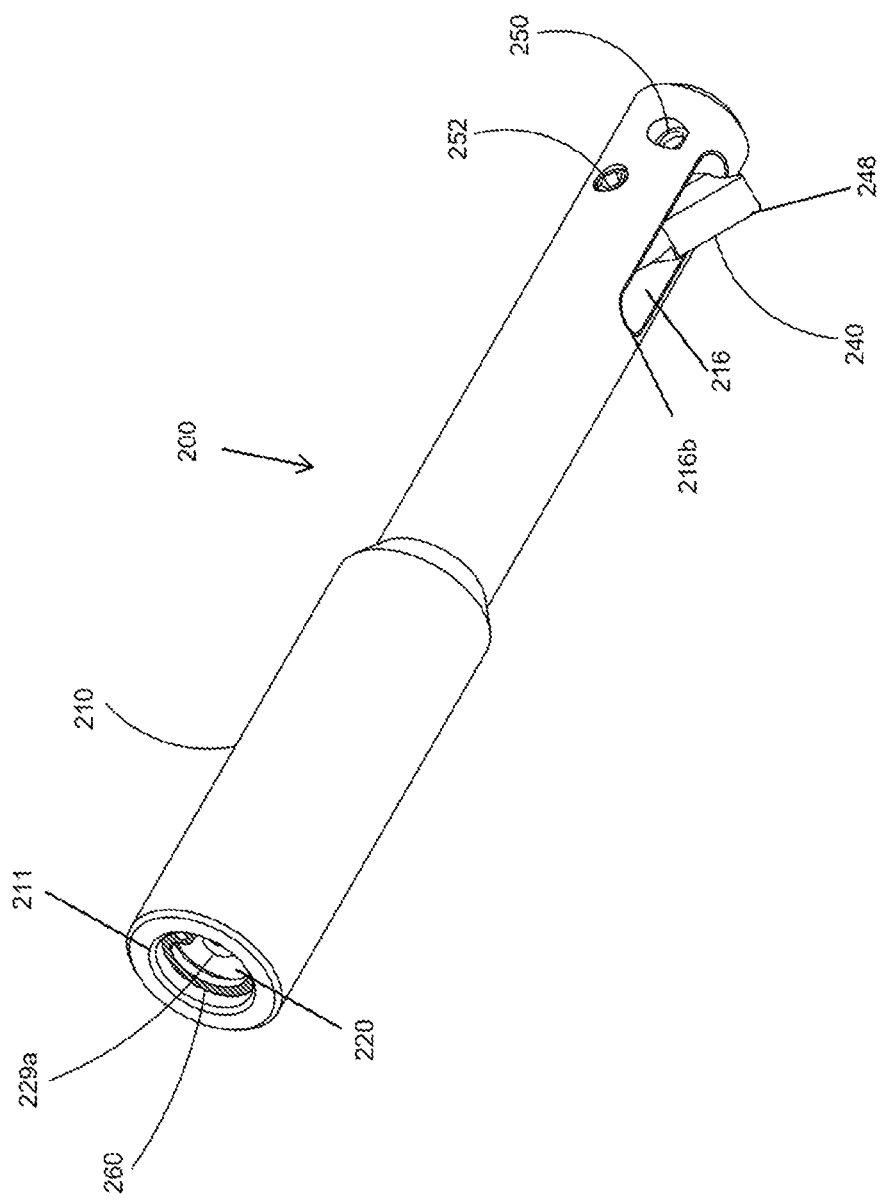
FIG. 4 is a general view of a machining tool according to some embodiments of the present invention with a deployable inclined blade in the deployed state.
Figure 5:
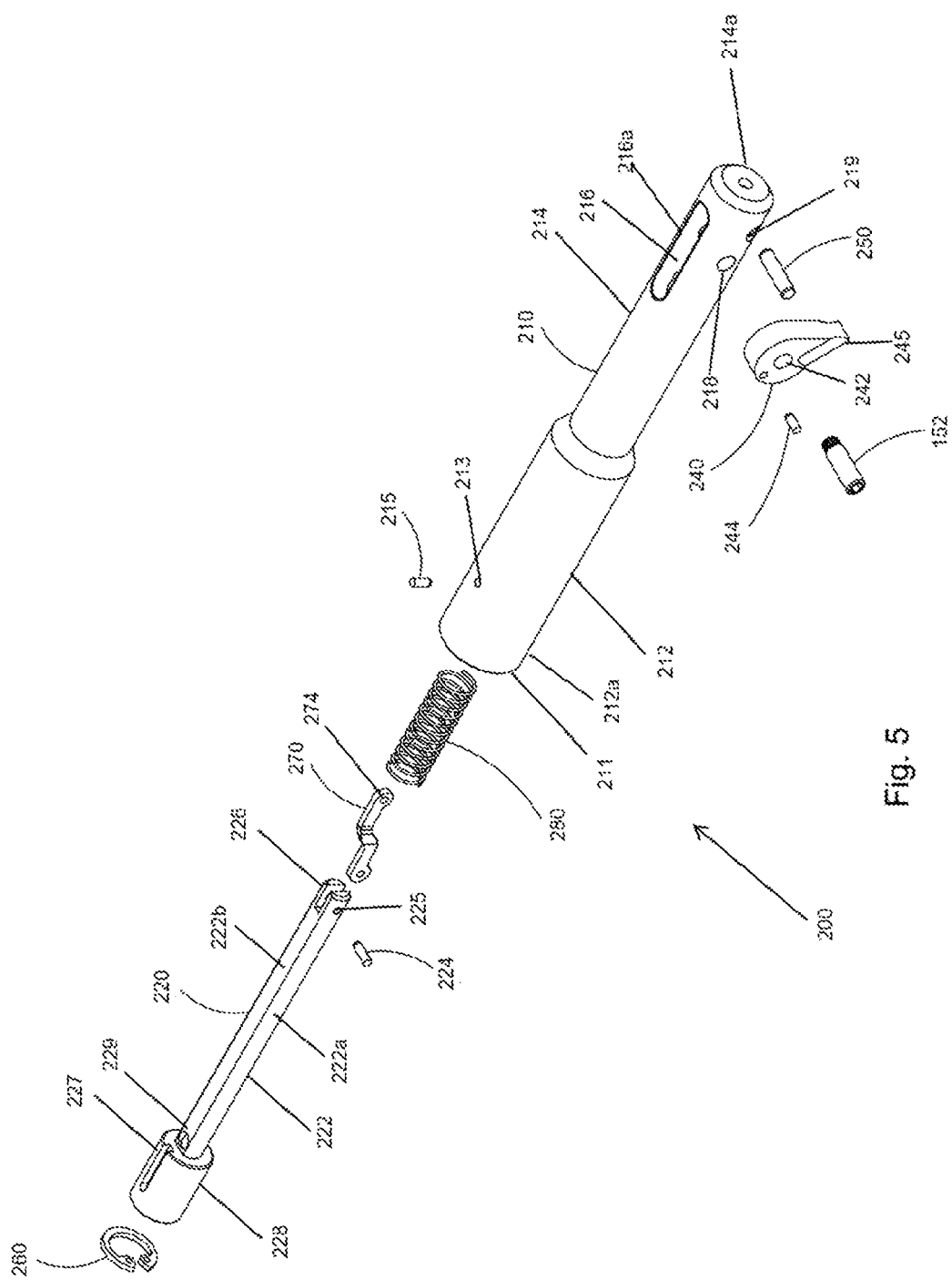
FIG. 5 is an exploded view of the machining tool of FIG. 4.

FIG. 4 is a general view of a machining tool with a deployable inclined blade in the deployed state, according to some embodiments of the present invention. FIG. 5 is an exploded view of the machining tool of FIG. 4. FIG. 6A is a cross sectional view of the machining tool of FIG. 4 with the deployable blade in a deployed state. FIG. 6B is a cross sectional view of the machining tool of FIG. 4 with the deployable blade in a retracted state. Machining tool 200 may have deployable blade 240. Deployable blade 240 may have sharp edge 245. Deployable blade 240 may have an inclination in order to machine a tapered hole. For example, deployable blade 240 with inclination may machine a countersink.

In some embodiments of the present invention, machining tool 200 may have deployable blade 240. Deployable blade 240 may have sharp edge 245 on proximal side deployable blade 240 for machining features on a back side of a workpiece. For example, deployable blade 240 may have sharp edge 245 on proximal side deployable blade 240 for machining a countersink on a back side of a workpiece (e.g., back countersink). In the deployed state, deployable blade 240 may be deployed from distal portion 214 of body 210 (e.g., through opening 216b), plunger 220 may be in the first position.

In some embodiments of the present invention, in the retracted state, deployable blade 240 may be retracted into distal portion 214 of body 210, plunger 220 may be in the second position. Connecting rod 270 may match the shape of deployable blade 240, so both deployable blade 240 and connecting rod 270 can fit in distal portion 214 of body 210, in the retracted state. For example, part of deployable blade 240 and connecting rod 270 may be abutting or positioned side by side inside distal portion 214 of body 210, in the retracted state. Connecting rod 270 may connect to deployable blade 240 by pin 244, connecting rod 270 may pivot about pin 244.

Figure 7:
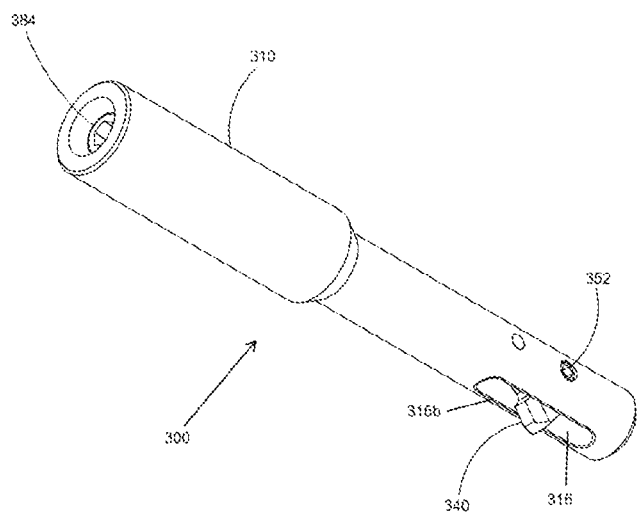
FIG. 7 is a general view of a machining tool according to some embodiments of the present invention with a deployable blade having frontal and rear sharp edges, in a deployed position.
Figure 8:
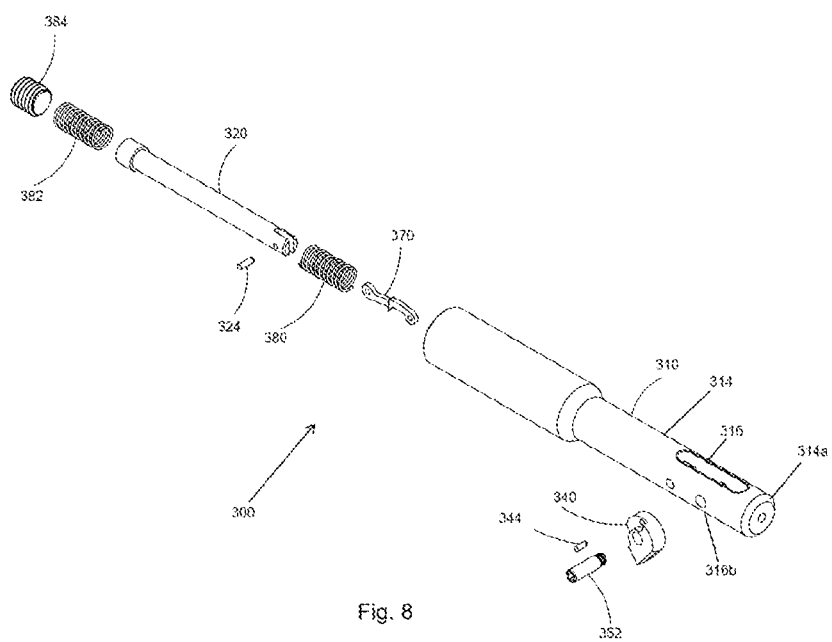
FIG. 8 is an exploded view of the machining tool of FIG. 7.
Figure 9:
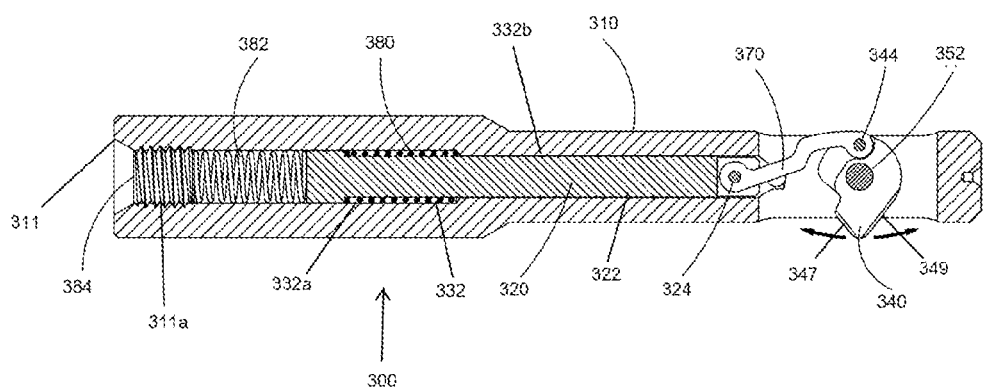
FIG. 9 is a cross sectional view of the machining tool of FIG. 7 with the deployable blade in a deployed state.

FIG. 7 is a general view of a machining tool with a deployable blade having frontal and rear sharp edges, in a deployed position, according to some embodiments of the present invention. FIG. 8 is an exploded view of the machining tool of FIG. 7. FIG. 9 is a cross sectional view of the machining tool of FIG. 7 with the deployable blade in a deployed state. Machining tool 300 may have deployable blade 340. Deployable blade 340 may have sharp edge 349 on a distal side of the deployable blade 340 for machining features on a front side of a workpiece. Deployable blade 340 may have sharp edge 347 on a proximal side of the deployable blade 340 for machining features on a back side of a workpiece. For example, machining tool 300 may be configured to machine features (e.g. counterbore) frontally (e.g. on any surface facing machining tool 300) and also machining tool 300 may be configured to machine back features (e.g. on a back side of a workpiece, through a hole in the workpiece).

In some embodiments of the present invention, machining tool 300 may have elongated body 310 with duct 332. Duct 332 may extend from proximal inlet 311 at proximal end 312a of body 310, through body 310 to distal portion 314 of body 310. Distal portion 314 of body 310 may have first lateral opening 316b, deployable blade 340 may deploy from opening 316b. Duct 332 may have threaded portion 311a at proximal inlet 311. Machining tool 300 may include threaded insert 384. Threaded insert 384 may be a screw, a hex bolt, or a similar threaded cylindrical element that can be fastened. Threaded insert 384 may have an indent or a crevice for attaching a fastening to said indent (e.g., screw driver). For example, threaded insert 384 may have a hex indent, a straight indent (e.g., for a flat head screw driver) or a cross shaped screw (e.g., like a machine screw). Threaded insert 384 may adjust a position of plunger 320 by adjusting the position of threaded insert 384 in threaded portion 311a of duct 332.

Threaded insert 384 may adjust a rotation angle of deployable blade 340. Screwing threaded insert 384 towards distal portion 314 of body 310 may increase the rotation angle of deployable blade 340 with respect to body 310. Screwing threaded insert 384 towards proximal inlet 311 of machining tool 300 may decrease the rotation angle of deployable blade 340 with respect to body 310. For example, the adjustment of the position of threaded insert 384 inside threaded portion 311a of duct 332 may change the angle of produced feature (e.g., countersink, grad removing, chamfering, edge breaking, etc.) in a workpiece.

In some embodiments of the present invention, connecting rod 370 may match the shape of deployable blade 340, so both deployable blade 340 and connecting rod 370 can fit in distal portion 314 of body 310, in the retracted state. For example, part of deployable blade 340 and connecting rod 370 may be abutting or positioned side by side inside distal portion 314 of body 310, in the retracted state. Connecting rod 370 may connect to deployable blade 340 by pin 344, connecting rod 370 may pivot about pin 344.

In some embodiments of the present invention machining tool 300 may have resilient element 380 inserted in duct 332. For example, resilient element 380 may be inserted deeper into duct 332 towards distal portion 314 of body 310. Resilient element 380 may press plunger 320 towards proximal inlet 311. Machining tool 300 may have proximal resilient element 382. Proximal resilient element 382 may be inserted between plunger 320 and threaded insert 384. Proximal resilient element 382 may press plunger 320 towards distal end 314a of body 310. Proximal resilient element 382 may counter the force applied by resilient element 380 on plunger 320. Resilient element 380 and proximal resilient element 382 may provide a shock absorbance mechanism for reducing shocks received by deployable blade 340. The position of threaded insert 384 inside threaded portion 311a of duct 332 may adjust the angle of deployable blade 340.

In some embodiments of the present invention deployable blade 340 may be naturally deployed. e.g., deployable blade 340 may be deployed unless a force is applied on deployable blade 340. Deployable blade 340 may be balanced by resilient element 380 and proximal resilient element 382. Resilient element 380 may counter the force applied on by proximal resilient element 382 on deployable blade 340. Deployable blade 340 may be pulled through a hole in a workpiece. Deployable blade 340 may machine a feature in a backside of the workpiece, e.g., break an edge of the hole. Deployable blade 340 may retract into distal portion 314 of body 310, when machining tool 300 is pulled through the hole in the workpiece. E.g., side walls of the hole may apply force on deployable blade 340 to retract deployable blade 340. When deployable blade 340 is pulled from the hole in the workpiece, deployable bale 340 may deploy. E.g., the side walls of the hole no longer press against deployable blade 340, resilient element 380 and proximal element 382 may apply force on deployable blade 340 so as to deploy it. When deployable 340 blade is deployed, deployable blade 340 may machine a feature on the workpiece. E.g., deployable blade 340 may break grades of a hole in the workpiece that deployable blade 340 was pulled from.

Different embodiments are disclosed herein. Features of certain embodiments may be combined with features of other embodiments. Thus, certain embodiments may be combinations of features of multiple embodiments. The foregoing description of the embodiments of the invention has been presented for the purposes of illustration and description. It is not intended to be exhaustive or to limit the invention to the precise form disclosed. It should be appreciated by persons skilled in the art that many modifications, variations, substitutions, changes, and equivalents are possible in light of the above teaching. It is, therefore, to be understood that the appended claims are intended to cover all such modifications and changes as fall within the true spirit of the invention.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

The invention claimed is:

1. A machining tool comprising:
   an elongated body forming a duct therewithin, the duct extending along an axial direction from an inlet at a first end of the body to a portion of the body at an opposite second end having a first lateral opening;
   a plunger configured to be movable between a first position closer to the first end of the body and a second position closer to the opposite second end along the duct;
   a resilient element for pressing the plunger toward the inlet to remain in the first position;
   a pivotally deployable blade deployable from the first lateral opening between a deployed state, when the plunger is held in the first position by the resilient element, and a retracted state, when the plunger is pushed towards the second position against the resilient element,
   wherein the deployed state of the deployable blade is a default state where no external forces are applied to the machining tool and the deployable blade is maintained deployed, except for when the plunger is moved to the second position, and when the deployable blade is pressed into the body, and
   wherein the deployable blade is connected to the plunger via a connecting rod that includes an offset that is pivotally connected to the deployable blade away from a pivot axis of the deployable blade.

2. The machining tool of claim 1, wherein the plunger is hydraulically operated.

3. The machining tool of claim 2, wherein the plunger comprises a conduit to transfer emulsion through the plunger into the duct.

4. The machining tool of claim 1, wherein a gap is provided between the plunger and the duct to allow emulsion to flow through the gap to the second portion of the body.

5. The machining tool of claim 1, wherein the deployable blade has a sharp edge on a first side of the deployable blade.

6. The machining tool of claim 5, wherein the deployable blade has a sharp edge on a second side of the deployable blade that is opposite to the first side.

7. The machining tool of claim 1, wherein the deployable blade has a sharp wedge on a tip of the deployable blade.

8. The machining tool of claim 1, wherein the deployable blade has an inclined sharp edge.

9. The machining tool of claim 1, wherein the portion of the body at the opposite second end has a second opposite lateral opening.

10. The machining tool of claim 1, further comprising a stopper at the first end of the body for stopping the plunger when the plunger is pressed by the resilient element towards the inlet.

11. The machining tool of claim 1, further comprising a stopper for preventing the plunger from rotating in the duct.

12. The machining tool of claim 1, further comprising a stopper pin at the portion of the body at the opposite second end, configured to stop the deployable blade from rotating beyond a predetermined angle.

13. The machining tool of claim 1, further comprising another resilient element between the plunger and the inlet configured to force the plunger towards the portion of the body at the opposite second end.

14. The machining tool of claim 1, wherein the duct comprises an internal thread and a threaded insert configured adjust a position of the plunger by adjusting a position of the threaded insert in the duct.

* * * * *